(12) United States Patent
Zaffaroni et al.

(10) Patent No.: US 12,528,108 B2
(45) Date of Patent: Jan. 20, 2026

(54) MANUFACTURE OF ROLL FORMED TUBES

(71) Applicant: HYDRO EXTRUDED SOLUTIONS AS, Oslo (NO)

(72) Inventors: Giorgio Giovanni Battista Zaffaroni, Tradate (IT); Marco Pasqualon, Bierges (BE); Jeffrey Lee Insalaco, Melbourne, FL (US); Vincent Buzzelle, Rockledge, FL (US); Andrej Mangelsdorf, Cologne (DE)

(73) Assignee: HYDRO EXTRUDED SOLUTIONS AS, Oslo (NO)

( * ) Notice: Subject to any disclaimer, the term of this patent is extended or adjusted under 35 U.S.C. 154(b) by 498 days.

(21) Appl. No.: 18/010,308

(22) PCT Filed: Jun. 10, 2021

(86) PCT No.: PCT/EP2021/065688
§ 371 (c)(1),
(2) Date: Dec. 14, 2022

(87) PCT Pub. No.: WO2021/254885
PCT Pub. Date: Dec. 23, 2021

(65) Prior Publication Data
US 2023/0278087 A1 Sep. 7, 2023

(30) Foreign Application Priority Data
Jun. 15, 2020 (SE) .................................... 2050715-8

(51) Int. Cl.
*B21C 37/08* (2006.01)
(52) U.S. Cl.
CPC ............................... *B21C 37/0822* (2013.01)

(58) Field of Classification Search
CPC . B21C 37/08; B21C 37/0807; B21C 37/0811; B21C 37/0822; B21C 37/0826; B21C 47/34; B23K 13/025; B23K 31/027
See application file for complete search history.

(56) References Cited

U.S. PATENT DOCUMENTS 3,175,069 A * 3/1965 Kohler ................. B23K 13/046
219/61.2
3,431,383 A * 3/1969 Ullery, Jr. ............ B23K 13/046
228/17

(Continued)

FOREIGN PATENT DOCUMENTS

| CN | 1390674 | 1/2003 |
|---|---|---|
| DE | 1 083 206 | 6/1960 |

(Continued)

OTHER PUBLICATIONS

Office Action issued Feb. 18, 2025, in Japanese Patent Application No. 2022-576383, with English-language translation.

(Continued)

*Primary Examiner* — Edward T Tolan
(74) *Attorney, Agent, or Firm* — Wenderoth, Lind & Ponack, L.L.P.

(57) ABSTRACT

A seam guide assembly configured to maintain the longitudinal edges of a metal strip in position before welding in a welding section of a welded tube roll forming apparatus, the seam guide assembly having a front seam guide tip component, a through channel being provided in the holder, the channel having an inlet opening located on said first side of the holder, adjacent the front seam guide tip component, and an outlet opening located on a second side of the holder, the outlet opening being configured to connect to a vacuum source; a welded tube roll forming apparatus having a vacuum extraction section configured to extract solid particles produced inside the tube during the high frequency (Continued)

induction welding of the tube edges, and being located in the apparatus at a position where the where the edges of the roll formed tube have not yet been welded together; and related method.

13 Claims, 5 Drawing Sheets

(56) References Cited

U.S. PATENT DOCUMENTS

| | | | | |
|---|---|---|---|---|
| 3,733,453 | A * | 5/1973 | McLain | B23K 13/02 219/614 |
| 4,635,841 | A * | 1/1987 | Frei | B23K 26/262 228/151 |
| 4,753,002 | A * | 6/1988 | Chabane | H01B 13/262 72/51 |
| 5,140,123 | A * | 8/1992 | Mitani | B23K 26/262 219/60 R |
| 5,192,016 | A | 3/1993 | Araki et al. | |
| 10,724,670 | B2 * | 7/2020 | Ide | B23K 20/227 |
| 2002/0170940 | A1 * | 11/2002 | Kazama | B21C 37/0811 228/173.7 |

FOREIGN PATENT DOCUMENTS

| | | |
|---|---|---|
| DE | 1 219 607 | 6/1966 |
| FR | 1 473 509 | 3/1967 |
| JP | H03-31076 | 3/1991 |
| JP | 9-99316 | 4/1997 |
| JP | 2002-283063 | 10/2002 |
| SU | 1268239 | 11/1986 |

OTHER PUBLICATIONS

Office Action/Search Report issued Apr. 9, 2025, in corresponding Chinese Patent Application No. 202180041992.0, with English translation.
International Search Report and Written Opinion of the International Searching Authority issued Nov. 18, 2021, in International (PCT) Application No. PCT/EP2021/065688.

* cited by examiner

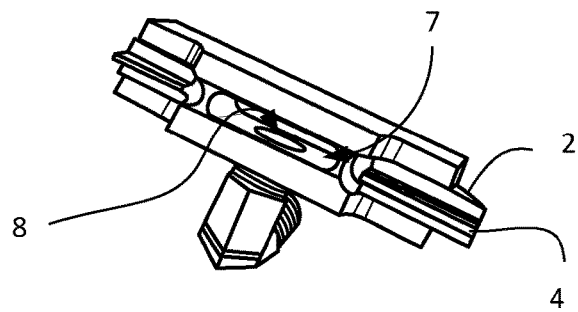
FIG. 6a
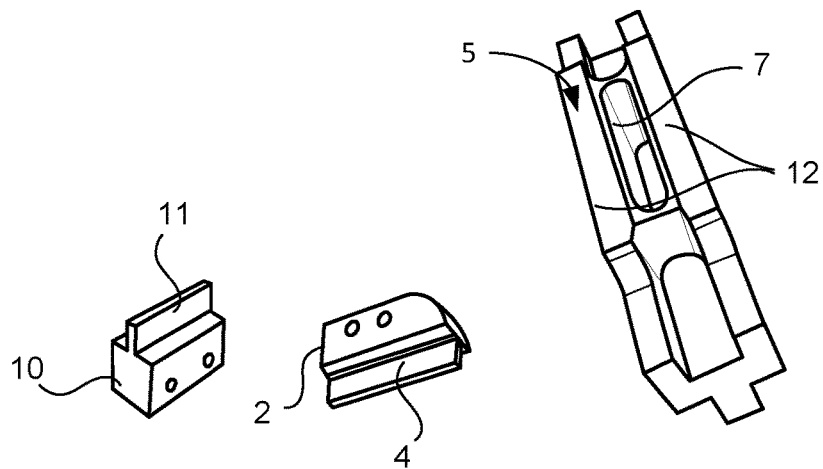
FIG. 6b
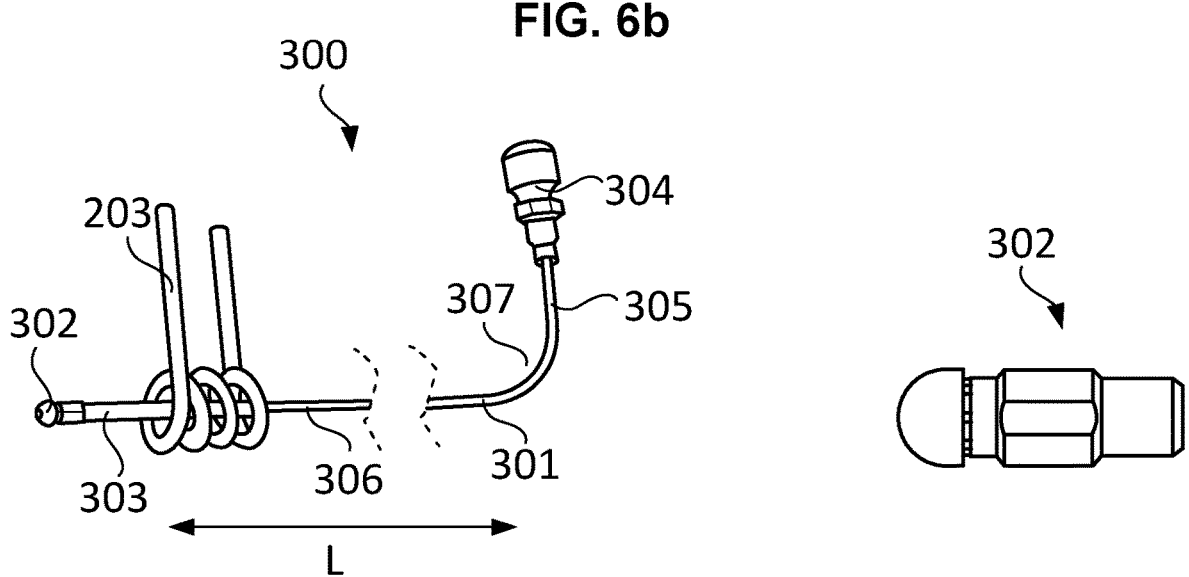
FIG. 7a
FIG. 7b

MANUFACTURE OF ROLL FORMED TUBES

TECHNICAL FIELD

The present disclosure pertains to the manufacture of roll formed and welded tubes, in particular to a seam guide assembly configured to be used in a welded tube roll forming apparatus, a roll forming apparatus comprising a seam guide assembly, and a method of manufacturing a tube comprising aluminium or alloys thereof by roll forming a strip in a welded tube roll forming apparatus.

BACKGROUND

Welded pipes and tubes are typically manufactured by longitudinally forming flat metal strips into a nearly complete tube and then welding the two edges together. There are many areas of application for roll formed tubing, for example in the field of the HVAC&R market (Heating, Ventilation, Air Conditioning, and Refrigeration). Within this technical field, environmental demands motivate a development toward air conditioning and refrigeration appliances with increased efficiency. In response to this, efforts have been made to supply smaller-diameter copper tubes with a wide range of inner surface enhancements, able to increase their heat transfer coefficient, in respect to standard smooth solutions. Usage of advanced products such as small diameter welded tubes with inner surface patterning involves the meeting of strict requirements in terms of tubes' inner contamination level. With increasing demands on cost reduction, there has been an interest in providing an alternative to copper tubing, which has traditionally been dominating for use in air conditioning and refrigeration appliances, in the form of aluminium tubing. However, it has been found difficult to manufacture aluminium tubes with characteristics that are competitive for the purpose of applications such as within the field of HVAC&R.

SUMMARY

The present disclosure relates to tools and methods for the manufacture of welded tubes, which provide for efficient manufacture of advanced tube products to be made of aluminium or alloys thereof. According to the present disclosure, there is provided a seam guide assembly configured to maintain the longitudinal edges of a metal strip, which is being roll formed into a tube, in position before welding the edges together in a welding section of a welded tube roll forming apparatus. The seam guide assembly comprises a front seam guide tip component, which is attached to a holder in such a way that an elongated tip protrudes from a first side of the holder, and the tip is configured to be inserted between the tube edges to be welded. A through channel is provided in the holder, the channel having an inlet opening located on the first side of the holder, adjacent the front seam guide tip component in a longitudinal direction of the holder, and an outlet opening located on a second side of the holder, and the outlet opening is configured to be connected to a vacuum source, for example by means of a connection fitting such as threads or bayonet coupling to which a connection part suitable for a vacuum source can be connected. The seam guide assembly preferably comprises a rear seam guide tip component, which is attached to the holder in such a way that an elongated tip protrudes from the first side of the holder, wherein the rear seam guide tip component is positioned on the holder on a distance from the front seam guide tip component in a longitudinal direction of the holder, and the channel inlet opening is located between the said front and rear tip components. Accordingly, the seam guide tip is divided into two parts with the channel inlet opening located there between. The inlet opening of the channel has a width, which suitably does not exceed the outer diameter of the tube, and which more preferably corresponds approximately to the distance between the edges of the strip being nearly formed into a tube. The inlet opening of the channel preferably has an elongated shape directed in the longitudinal direction of the holder, so as to conform to the opening between the strip edges to be welded. The holder may preferably comprise guiding flanges arranged on each side of the channel inlet opening.

According to the present disclosure, there is also provided a welded tube roll forming apparatus comprising a roll forming section configured to form a metal strip into a tube, followed by a welding section. The welding section comprises a seam guide assembly, a high frequency induction weld coil and a pair of weld rollers and is configured to weld together the longitudinal edges of a metal strip, which is being roll formed into a tube, while the tube is forwarded through the apparatus in a travel direction. The apparatus further comprises a vacuum extraction section configured to extract solid particles produced inside the tube during the high frequency induction welding of the tube edges, the vacuum extraction section being located in the apparatus at a position where the edges of the roll formed tube have not yet been welded together. The vacuum extraction section can suitably comprise a seam guide assembly as described above arranged between the weld coil and the roll forming section. The vacuum extraction section may advantageously comprise a gap vacuum nozzle configured to be connected to a vacuum source and being arranged rearward of the seam guide assembly in the travel direction of the tube, and the gap vacuum nozzle is configured to extract solid particles through the opening between the not yet welded edges of the tube. The vacuum extraction section can further comprise a tube vacuum nozzle configured to be connected to a vacuum source and being arranged rearward of the seam guide assembly in the travel direction of the tube, said tube vacuum nozzle being configured to be positioned within the roll formed and not yet welded tube to extract solid particles which are present inside the tube.

The apparatus can further advantageously comprise a back flushing device, which comprises a tubular member having a gas valve attached to an outlet end thereof and a coupling attached to an inlet end thereof, said coupling being configured to be connected to a pressurized gas source. The back flushing device is configured to apply a gas flow in a direction opposite to the travel direction of the tube at a position in front of the weld coil in the tube travel direction, so as to force any remaining solid particles in a direction opposite to the travel direction of the formed tube, so that they can be extracted in the vacuuming section. The gas may suitably be a reverse flow nozzle. The tubular member of the back flushing device may include a straight first section having a front end, onto which the reverse flow nozzle is attached, said straight section having a length which exceeds the distance from a rear end of the seam guide assembly to a position in front of the weld coil in the tube travel direction, and the straight first section has an outer diameter which is smaller than the inner diameter of the tube to be welded, so that it can be inserted into the finished tube. The tubular member may further comprise a second section having a rear end carrying the coupling. The second section can be at an angle in relation to the first section. The back flushing device is preferably arranged in the apparatus, in such a way that the metal strip is roll formed around the straight first section of the tubular member and the reverse flow nozzle is located in front of the weld coil in the travel direction of the tube.

The present disclosure further relates to a tube which has been manufactured by the apparatus described above, wherein the metal strip comprises aluminium or alloys thereof.

According to the present disclosure, there is also provided a method of manufacturing a tube comprising aluminium or alloys thereof. The method comprises roll forming a strip comprising aluminium or alloys thereof into a tube in a roll forming section of a welded tube roll forming apparatus; and welding together the tube edges in a high frequency induction welding section of the apparatus, comprising a weld coil and a pair of weld rollers. The welding comprises extracting solid particles produced inside the tube during the high frequency induction welding by application of vacuum at a section of the tube, where the longitudinal edges of a metal strip, which is being roll formed into a tube have not yet been welded together. The method may preferably comprise back flushing of the solid particles by applying pressurized gas in a direction opposite to the travel direction of the tube at a position in front of the weld coil in the tube travel direction.

The detailed description and specific examples given below disclose preferred embodiments of the disclosure by way of illustration only. Those skilled in the art understand from guidance in the detailed description that changes and modifications may be made within the scope of the disclosure.

DRAWINGS

FIG. 1 schematically illustrates a forming and welding apparatus;

FIG. 2 schematically illustrates a high frequency welding setup;

FIG. 3 schematically illustrates the position of a vacuum extraction section in a forming and welding apparatus;

FIG. 6a shows the seam guide assembly from the seam guide tip side;

FIG. 6b shows the parts of the seam guide assembly;

FIG. 7a shows a back flushing device

FIG. 7b shows a gas valve of the back flushing device

Figure 8:
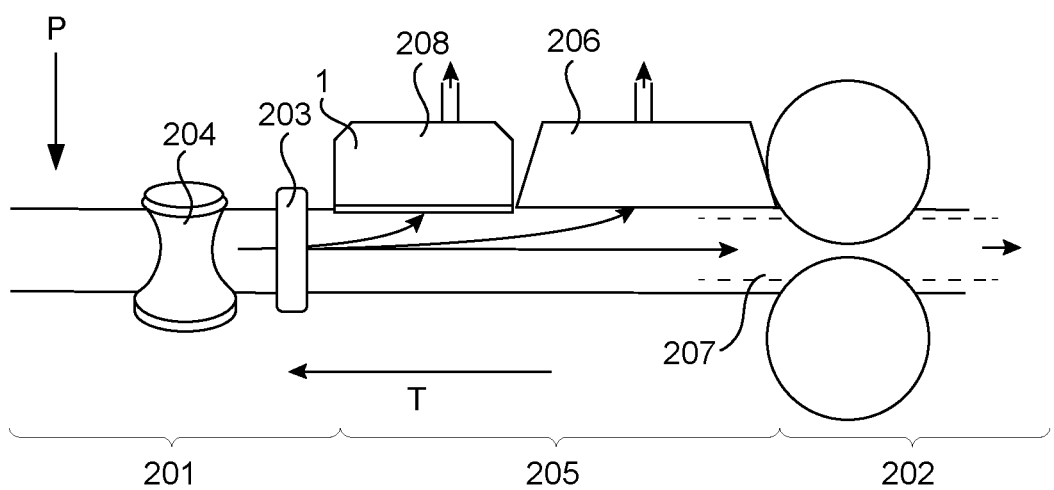

FIG. 8 schematically illustrates a part of a forming and welding apparatus showing the position of a tube vacuum nozzle and gap vacuum nozzle.

DETAILED DESCRIPTION

The present disclosure relates to tools and methods for manufacture of tubes, which allow manufacture of advanced small diameter aluminium tube products having a diameter of 20 mm or less, preferably 5-10 mm. The tube products are preferably manufactured as continuous tube coils having a length of over 500 m, preferably over 1000 m. Such tube products find use for example within the field of heating, ventilation, air conditioning or refrigeration.

The process of welded tube roll forming involves roll forming a strip into a tubular shape and welding the longitudinal edges of the strip together so as to obtain the tube by means of high frequency welding in an induction heating weld coil. To achieve this, the strip is fed into a forming mill or apparatus that shapes the strip through different consecutive forming steps, performed by as many forming rolls, as shown schematically in FIG. 1. As the strip passes through the weld coil, an electromagnetic field is induced around the weld coil, which induces a current to flow in the strip, mostly concentrated at the edges to be joined. The metals resistance to the electricity flow generates the necessary heat development at these edges, that rapidly reach the melting point. When the edges are still in molten state, they are forged together thanks to the interaction with side squeeze rolls, applying force on the strips and, therefore, generating the required pressure at the two edges' interface. When passing through the weld rolls, the oxidized metal and the molten metal is extruded out of the joint and the clean underlying metal is bonded. Following the welding, sizing rolls complete the process, giving desired final geometry to the tube.

Figure 2:
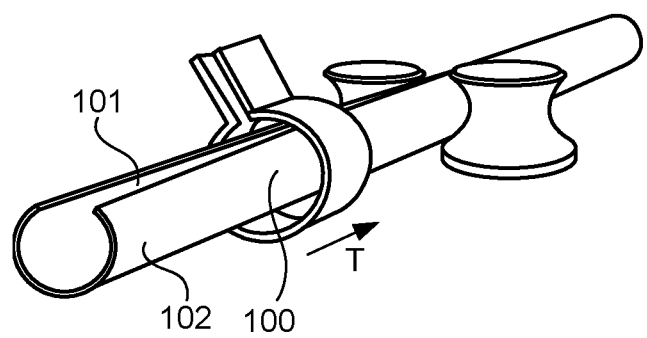

In the high frequency welding, the current flowing in the work coil produces a magnetic field, which intersects with the nearly-formed open tube. Two key physical phenomena result from employing the high frequency alternated current: the "skin effect", which refers to the induced high frequency currents tending to flow in a shallow skin of the conductor, and the "proximity effect", which refers to that the vicinity of two conductors, into which inducted current is flowing, will have a tendency to concentrate the current flow in the opposed surfaces of the conductors. Due to the skin and proximity effects, the induced current will concentrate in the "Vee", i.e. the V-shaped space formed between the longitudinal strip edges just before the welding point, and in the edge "skin" volume, i.e. the outside of the strip in the area located within the weld coil. FIG. 2 schematically illustrates of high frequency welding setup.

In aluminium tube making by high frequency welding an emission of solid particles, i.e. a spray of aluminium particles, is caused due to presence of electromagnetic force applied onto the liquid phase at the apex of the Vee, where strip edges are meeting. This solid particle emission is sprayed in all directions from the welding point, which means that it ends up also inside the welded tube. As the tube travels with high speed through the manufacturing apparatus, the solid contamination particles will travel along with the tube away from the opening between the not yet welded strip edges.

Manufacture and use of advanced products such as small diameter welded aluminium tubes with inner surface patterning involve the meeting of strict requirements in terms inner contamination level for the tubes, with a cleanliness limit usually set below 0.5 mg/ft of solid particle inner contamination. However, the level of solid particles contamination resulting from high frequency welding small diameter aluminium tubes (having a diameter of 10 mm or less) result in solid particles contamination levels which may typically be 25-100 times higher than the level accepted in the final tube product. This is a problem when manufacturing small diameter tubing having considerable length, since it is difficult to flush out these particles from the finished tube. In order to obtain proper flow characteristics in the tube when it is installed in for example a heating, ventilation, air conditioning or refrigeration appliance, it is important to avoid the presence of contamination, e.g. in the form of particles, in the final tube product. The present disclosure therefore aims at providing a solution which facilitates the manufacture of roll formed welded aluminium tubing. This solution relies on removal of internal solid particle contamination performed in-line during the manufacture of the welded tube, by means of vacuum extraction. Thereby, the product quality of the manufactured tube product can be improved, and hence advanced small diameter tubes can be made from aluminium or alloys thereof.

Accordingly, a seam guide assembly is provided which can be used in a welded tube forming apparatus to enable removal of the emission of solid particles resulting inside the welded tube due to the high frequency welding by means of applying a vacuum. A seam guide is arranged directly before the welding coil in the travel direction (T) of the tube and is provided to guide the weld seam and prevent sliver formation in the strip edges, to avoid seam rolling and provide good electric insulation prior to the weld coil. The seam guide assembly is thus configured to maintain the longitudinal edges of the metal strip, which is being roll formed into a tube, in position before welding the edges together in a welding section of a welded tube roll forming apparatus. The seam guide assembly comprises a front seam guide tip component, which is attached to a holder in such a way that an elongated tip protrudes from a first side of the holder in a direction away from said first side, and the tip is configured to be inserted between the tube edges to be welded.

The holder may typically have a generally elongated shape suitable for positioning along the tube, and said first side is the side of the holder that is intended to face the tube to be welded during the welding process. In the welding process, the longitudinal tube edges are pressed against the side surfaces of the tip as they are squeezed towards each other by means of the squeeze rolls, thereby being held in position by the tip of the seam guide assembly assisted by the squeeze rolls. The front seam guide tip component may also extend from the holder in the longitudinal direction of the holder, so that its outermost tip edge can extend further forward along the tube, than is possible for the holder due to lack of space. A through channel is provided in the holder. The channel has an inlet opening located on the first side of the holder, i.e. the side facing the tube to be welded, and an outlet opening located on a second side of the holder, i.e. a side of the holder that is not facing the tube, for example on a side perpendicular to the first side, or opposite to the first side.

The inlet opening of the through channel is located adjacent the front seam guide tip component in a longitudinal direction of the holder, and the outlet opening is configured to be connected to a vacuum source. By means of the vacuum source, the emission of particles which has been sprayed inside the tube due the high frequency welding can be removed from the interior of the formed and welded tube through the channel of the seam guide assembly. A connection part can be attached to the outlet opening to facilitate connection to a vacuum source.

The seam guide assembly preferably comprises a rear seam guide tip component, which is attached to the holder in such a way that an elongated tip protrudes from the first side of the holder, wherein the rear seam guide tip component is positioned on the holder on a distance from the front seam guide tip component in a longitudinal direction of the holder, and the channel inlet opening is located between the said front and rear tip components. Accordingly, the seam guide tip is divided into two parts with the channel inlet opening located there between. This allows the strip edges to be welded to be guided properly along a greater length of the roll formed strip. The holder of the seam guide assembly may suitably be made of brass, and the seam guide tip component are suitably made from an electrically insulating material, preferably ceramic material. The inlet opening of the channel has a width, which suitably does not exceed the outer diameter of the tube, and which more preferably corresponds approximately to the distance between the edges of the strip being nearly formed into a tube. Thereby, the vacuum applied through the channel will act effectively on the interior of the roll formed strip. The inlet opening of the channel preferably has an elongated shape directed in the longitudinal direction of the holder, so as to conform to the opening between the strip edges to be welded. To facilitate correct positioning of the seam guide, the holder may preferably comprise guiding flanges arranged on each side of the channel inlet opening. The seam guide assembly does not include any component that would need to travel inside the tube during the welding process. Thereby, the present seam guide assembly allows welding of tubes of very small diameter, such as 20 mm or less, preferably 5-10 mm.

According to the present disclosure, there is also provided a welded tube roll forming apparatus comprising a roll forming section configured to form a metal strip into a tube, followed by a welding section. The welding section comprises a seam guide assembly, a high frequency induction weld coil and a pair of weld rollers and is configured to weld together the longitudinal edges of a metal strip, which is being roll formed into a tube, while the tube is forwarded through the apparatus in a travel direction. The weld coil is typically a copper tube bent to create multiple windings perpendicular to the tube direction.

The apparatus further comprises a vacuum extraction section configured to extract solid particles produced inside the tube during the high frequency induction welding of the strip edges. The vacuum extraction section is located in the apparatus at a position where the edges of the roll formed strip have not yet been welded together, i.e. rearward of the welding section (201), i.e. upstream of the welding section in the travel direction of the tube. The vacuum extraction section is preferably arranged in the apparatus such that is covers the gap between the not yet welded strip edges adjacent the weld coil. The vacuum depression should be selected to sufficiently remove particles present inside the tube, for example a pull of approx. 10 m/s or more with vacuum pipe diameter of 2-5 cm.

The vacuum extraction section can suitably comprise a seam guide assembly as described above arranged between the weld coil and the roll forming section, preferably as close as possible to the weld coil. The vacuum extraction section may advantageously comprise a gap vacuum nozzle configured to be connected to a vacuum source and being arranged rearward of the seam guide assembly in the travel direction of the tube, and the gap vacuum nozzle is configured to extract solid particles through the opening between the not yet welded edges of the tube. The gap vacuum nozzle can suitably be positioned on top of the opening between the edges of the nearly tube-formed strip, having a width which does not exceed the outer diameter of the tube, and which is greater than the distance between the edges, covering the entire or part of the length of nearly tube-formed strip comprised between the tube roll forming section of the apparatus and the seam guide tip assembly. The vacuum extraction section can further comprise a tube vacuum nozzle configured to be connected to a vacuum source and being arranged rearward, i.e. upstream, of the seam guide assembly in the travel direction of the tube, said tube vacuum nozzle being configured to be positioned within the roll formed and not yet welded tube to extract solid particles which are present inside the tube. In this way internal particle contamination can be further reduced.

As mentioned above, it is difficult to flush small diameter tubes having considerable length. However, according to the present disclosure, the apparatus can advantageously comprise a back flushing device, in order to further improve the removal of any particles inside the finished tube. The back flushing device comprises a tubular member having a gas valve attached to an outlet end thereof and a coupling attached to an inlet end thereof, said coupling being configured to be connected to a pressurized gas source, preferably a neutral gas, such as nitrogen gas. The back flushing device is configured to apply a gas flow in a direction opposite to the travel direction of the tube at a position in front of the weld coil in the tube travel direction, so as to force any remaining solid particles in a direction opposite to the travel direction of the formed tube, so that they can be extracted in the vacuuming section, thus further facilitating removal of particles inside the welded tube, which still remain after the welding point, i.e. downstream of the welding point, preferably also downstream of the squeeze rolls which may be part of the welding section. Accordingly, back flushing of a gas from a location, inside the tube, beyond the forging point yields an ultimate increase in vacuuming efficiency and spume removal.

The gas valve may suitably be a reverse flow nozzle. The tubular member may be a flexible pipe made of heat resistant material, such as PTFE. The tubular member of the back flushing device may include a straight first section having a front end, onto which the reverse flow nozzle is attached, said straight section having a length which exceeds the distance from a rear end of the seam guide assembly to a position in front of the weld coil in the tube travel direction, and the straight first section has an outer diameter which is smaller than the inner diameter of the tube to be welded, so that it can be inserted into the finished tube. The tubular member may further comprise a second section having a rear end carrying the coupling. The second section can be at an angle in relation to the first section. The back flushing device is preferably arranged in the apparatus, in such a way that the metal strip is roll formed around the straight first section of the tubular member and the reverse flow nozzle is located in front of the weld coil in the travel direction of the tube. The portion of the tubular member of the back flushing device closest to the induction coil may be made of glass fibre reinforced epoxy material or ceramic material to be able to withstand high temperature locally generated at welding and avoid damages due to contact with solid particles. The gas valve may have an outer diameter smaller than the tube inner diameter. It should be noted that the back flushing device can be used independently in an apparatus for manufacture of roll formed and welded tubes, i.e. it does not necessarily need the presence of a vacuuming device or seam guide assembly.

The present disclosure further relates to a tube which has been manufactured by the apparatus described above, wherein the metal strip comprises aluminium or alloys thereof.

A method of manufacturing a tube comprising aluminium or alloys thereof is also provided. The method comprises roll forming a strip comprising aluminium or alloys thereof into a tube in a roll forming section of a welded tube roll forming apparatus; and welding together the tube edges in a high frequency induction welding section of the apparatus, comprising a weld coil and a pair of weld rollers. The welding comprises extracting solid particles produced inside the tube during the high frequency induction welding by application of vacuum at a section of the tube, where the longitudinal edges of a metal strip, which is being roll formed into a tube have not yet been welded together. The method may preferably comprise back flushing of the solid particles by applying pressurized gas in a direction opposite to the travel direction of the tube at a position in front of the weld coil in the tube travel direction. The strip from which the tube is formed preferably has an enhanced surface obtained by embossing a pattern to increase heat transfer properties of the tube product. The strip width is selected so that the formed tube attains a desired diameter, preferably of 20 mm or less, preferably 5-10 mm.

DESCRIPTION OF EXAMPLE EMBODIMENTS

The tools and methods of the present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
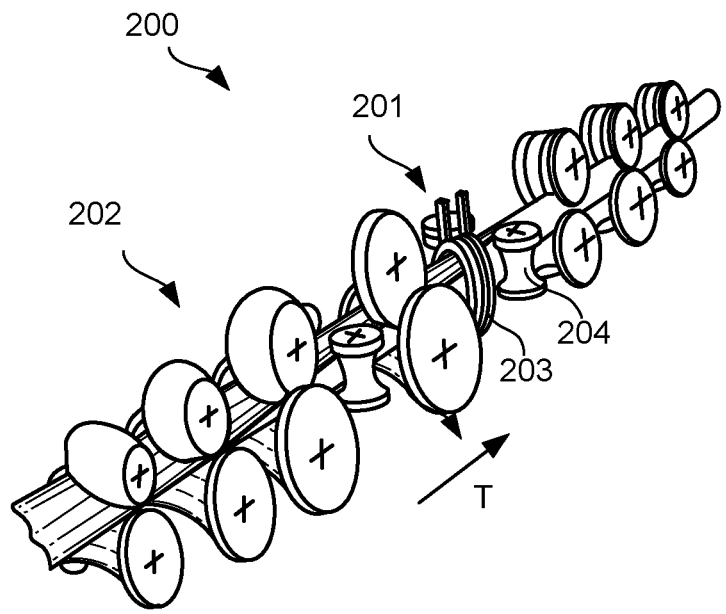

FIG. 1 schematically illustrates a conventional welded tube roll forming apparatus 200 comprising a roll forming section 202 configured to form a metal strip into a tube, followed by a welding section 201, a high frequency induction weld coil 203 and a pair of weld rollers 204. This apparatus does not comprise a seam guide assembly.

FIG. 2 schematically illustrates a high frequency welding setup in closer detail, with the metal strip 102 nearly formed to a tube 100. This drawing shows how the strip is formed so that the longitudinal edges abut one another, and how the nearly closed tube is moved through the welding coil.

Figure 4:
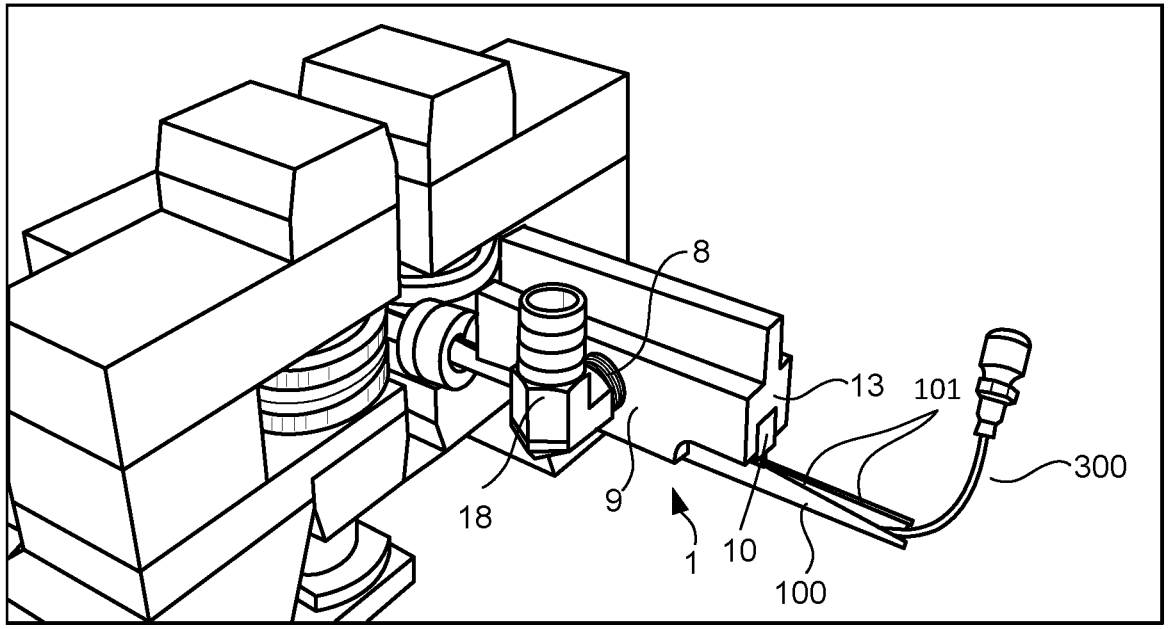
FIG. 4 is a perspective view of the welding section of a forming and welding apparatus including a seam guide assembly.

FIG. 4 is a perspective view of the welding section of a forming and welding apparatus including the seam guide assembly of the present disclosure. FIG. 4 also illustrates how the back flushing device 300 is inserted into the nearly closed tube. The opening between the longitudinal side edges of the strip is somewhat exaggerated for illustration purposes.

Figure 5:
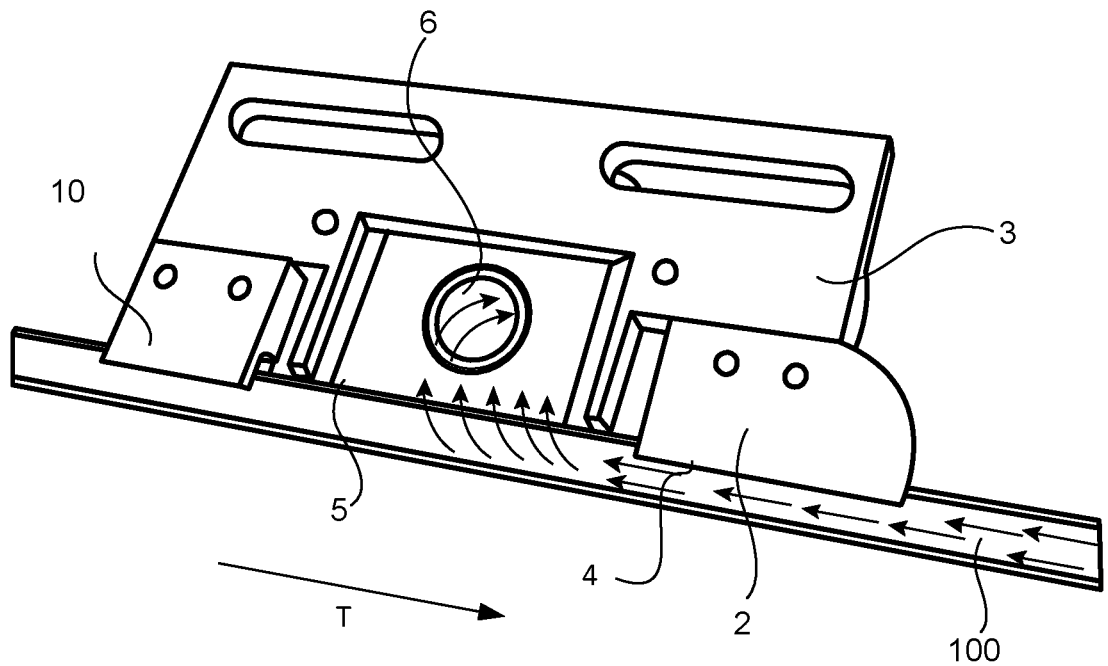
FIG. 5 is a cross-sectional view of the seam guide assembly in a longitudinal direction thereof.

FIG. 5 is a cross-sectional view of the seam guide assembly in a longitudinal direction thereof. The small arrows in FIG. 5 show the travel path of the solid particles to be extracted. FIG. 6a shows the seam guide assembly from the seam guide tip side, and FIG. 6b shows the parts of the seam guide assembly.

The seam guide assembly 1 is configured to maintain the longitudinal edges 101 of a metal strip 102, which is being roll formed into a tube 100, in position before welding the edges together in the welding section 201 of a welded tube roll forming apparatus 200. The seam guide assembly 1 comprises a front seam guide tip component 2, attached to a holder 3 so that an elongated tip 4 protrudes from a first side 5 of the holder 3. The tip 4 is configured to be inserted between the tube edges 101 to be welded. A through channel 6 is provided in the holder 3. The channel has an inlet opening 7 located on the first side 5 of the holder, adjacent the front seam guide tip component 2 in a longitudinal direction of the holder, and an outlet opening 8 located on a second side 9 of the holder. The outlet opening is configured to be connected to a vacuum source. A connection part 18 can be coupled to the outlet opening, for example by means of threads. A rear seam guide tip component 10 is attached to the holder 3 so that an elongated tip 11 protrudes from the first side 5 of the holder 3 The rear seam guide tip component 10 is positioned on the holder on a distance from the front seam guide tip component 2 in a longitudinal direction of the holder, and the channel inlet opening 7 is located between the said front and rear tip components 2, 10. The holder 3 comprises guiding flanges 12, which are arranged on each side of the channel inlet opening 7.

Figure 3:
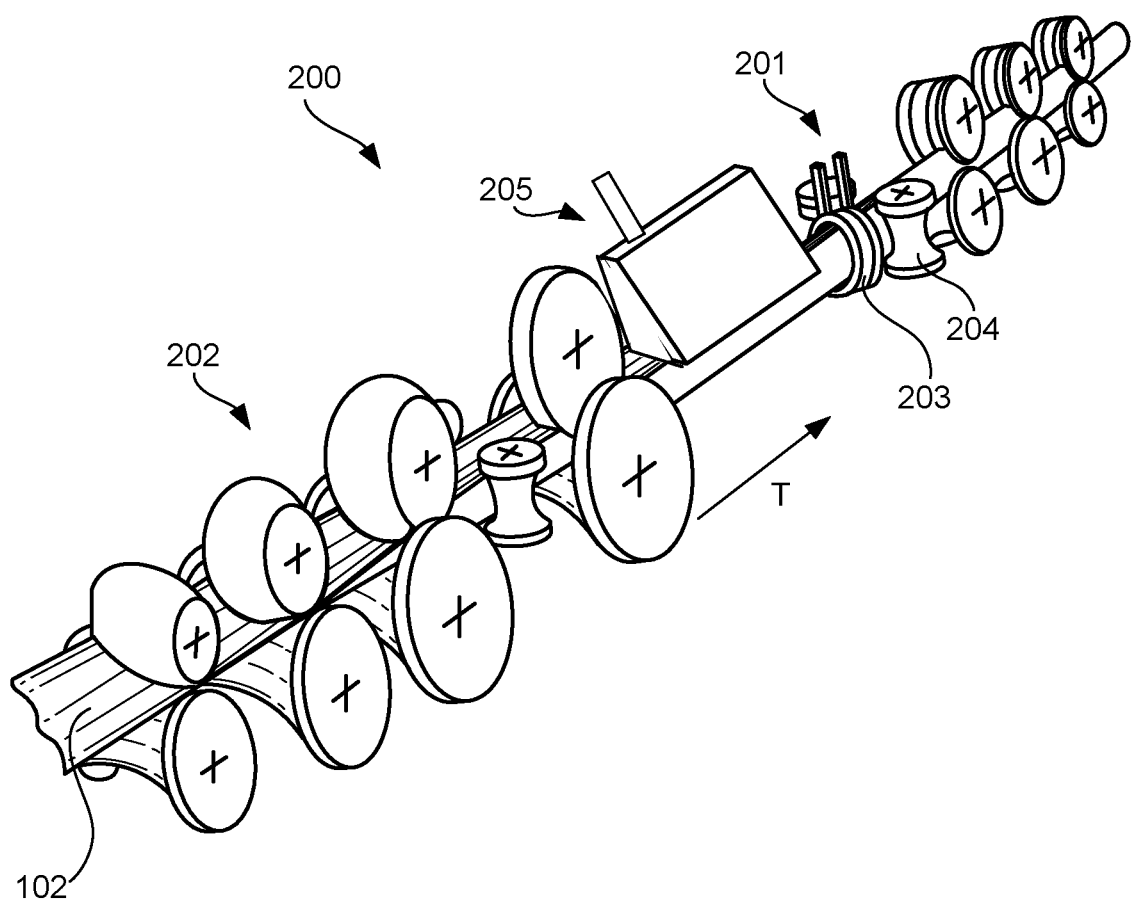

FIG. 3 schematically illustrates a welded tube roll forming apparatus 200 comprising a roll forming section 202 configured to form a metal strip 102 into a tube 100, followed by a seam guide assembly and/or vacuum extraction section 205 and a welding section 201 comprising a high frequency induction weld coil 203 and a pair of weld rollers 204. The apparatus is configured to weld together the longitudinal edges 101 of a metal strip 102, which is being roll formed into a tube 100, while the tube is forwarded through the apparatus in a travel direction (T). FIG. 3 schematically illustrates the position of a vacuum extraction section 205 in a forming and welding apparatus. This drawing illustrates how the vacuum extraction section, which can include both a seam guide and a vacuuming equipment, is arranged over the not yet closed and welded tube, without details for the equipment therein, which are shown more clearly in the following drawings. The high frequency induction weld coil 203 can be designed in various ways, as shown for example in FIGS. 2-4 and 7*a*.

The apparatus further comprises vacuum extraction section 205 configured to extract solid particles produced inside the tube 100 during the high frequency induction welding of the tube edges, the vacuum extraction section 205 being located in the apparatus at a position where the edges 101 of the roll formed tube have not yet been welded together. The vacuum extraction section 205 comprises a seam guide assembly 1 arranged between the weld coil 203 and the roll forming section 202.

As illustrated schematically in FIG. 8 welded vacuum extraction section 205 of the tube roll forming apparatus can include a gap vacuum nozzle 206 and a tube vacuum nozzle 207. The arrows in the figure shows the travel path of the solid particles to be extracted. The gap vacuum nozzle 206 is connected to a vacuum source and is arranged rearward of the seam guide assembly 208 in the travel direction (T) of the tube 100, and is configured to extract solid particles through the opening between the not yet welded edges of the tube. The tube vacuum nozzle 207 is also connected to a vacuum source and is arranged rearward of the seam guide assembly 208 in the travel direction (T) of the tube 100. The tube vacuum nozzle 207 is positioned within the roll formed and not yet welded tube to extract solid particles which are present inside the tube.

FIG. 7*a* shows a back flushing device and FIG. 7*b* shows a gas valve 302 thereof, which is in the form of a reverse flow nozzle. The back flushing device 300 comprises a tubular member 301 having a gas valve 302 attached to an outlet end 303 thereof and a coupling 304 attached to an inlet end 305 thereof. The coupling is connected to a pressurized gas source, and the back flushing device applies a gas flow in a direction opposite to the travel direction (T) of the tube 100 at a position (P) in front of the weld coil 203 in the tube travel direction (T). In the shown example, the tubular member 301 of the back flushing device 300 includes a straight first section 306 having a front end 303, onto which the reverse flow nozzle 302 is attached. This straight section 306 has a length L which exceeds the distance from a rear end 13 of the seam guide assembly 1 to a position (P) in front of the weld coil 203 in the travel direction (T) of the tube 100 (as seen e.g. in FIG. 8). The tubular member 301 comprises a second section 307 having a rear end carrying the coupling 304, said second section 307 being at an angle in relation to the first section 306. As shown in FIGS. 4 and 8, the back flushing device 300 can be arranged in such a way that the metal strip 102 is roll formed around the straight first section 306 of the tubular member 301 and the reverse flow nozzle 302 is located in front of the weld coil in the travel direction (T) of the tube 100.

The person skilled in the art realizes that the present disclosure is not limited to the preferred embodiments described above. The person skilled in the art further realizes that modifications and variations are possible within the scope of the appended claims

The invention claimed is:

1. A welded tube roll forming apparatus (200) comprising a roll forming section (202) configured to form a metal strip (102) into a tube (100), followed by a welding section (201) comprising a high frequency induction weld coil (203) and a pair of weld rollers (204) and being configured to weld together the longitudinal edges (101) of a metal strip (102), which is being roll formed into a tube (100), while the tube is forwarded through the apparatus in a travel direction (T),
wherein the apparatus further comprises vacuum extraction section (205) configured to extract solid particles produced inside the tube (100) during the high frequency induction welding of the tube edges, said vacuum extraction section (205) being located between the weld coil (203) and the roll forming section (202) where the edges (101) of the roll formed tube have not yet been welded together,
wherein the vacuum extraction section (205) comprises the seam guide assembly (1), said seam guide assembly (1) comprising a front seam guide tip component (2), which is attached to a holder (3) in such a way that an elongated tip (4) protrudes from a first side (5) of the holder (3), said tip (4) being configured to be inserted between the tube edges (101) to be welded,
wherein a through channel (6) is provided in the holder (3), said channel having an inlet opening (7) located on said first side (5) of the holder, adjacent the front seam guide tip component (2) in a longitudinal direction of the holder, and an outlet opening (8) located on a second side (9) of the holder, said outlet opening being configured to be connected to a vacuum source, and
wherein the through channel (6) is configured for removal of emission of solid particles resulting inside the tube (100) due to welding by means of applying a vacuum at the outlet opening (8), and the inlet opening (7) of the channel (6) has an elongated shape directed in the longitudinal direction of the holder (3).

2. The apparatus of claim 1, wherein the vacuum extraction section (205) comprises a gap vacuum nozzle (206) configured to be connected to a vacuum source and being arranged rearward of the seam guide assembly (208) in the travel direction (T) of the tube (100), said gap vacuum nozzle (206) being configured to extract solid particles through the opening between the not yet welded edges of the tube.

3. The apparatus of claim 1, wherein the vacuum extraction section (205) comprises a tube vacuum nozzle (207) configured to be connected to a vacuum source and being arranged rearward of the seam guide assembly (208) the travel direction (T) of the tube (100), said tube vacuum nozzle (207) being configured to be positioned within the roll formed and not yet welded tube to extract solid particles which are present inside the tube.

4. The apparatus (200) of claim 1, further comprising a back flushing device (300), which comprises a tubular member (301) having a gas valve (302) attached to an outlet end (303) thereof and a coupling (304) attached to an inlet end (305) thereof, said coupling being configured to be connected to a pressurized gas source, said back flushing device being configured to apply a gas flow in a direction opposite to the travel direction (T) of the tube (100) at a position (P) in front of the weld coil (203) in the tube travel direction (T).

5. The apparatus (200) of claim 4, wherein said gas valve (302) is a reverse flow nozzle.

6. The apparatus of claim 4, wherein the tubular member (301) of the back flushing device (300) includes a straight first section (306) having a front end (303), onto which the reverse flow nozzle (302) is attached, said straight section (306) having a length (L) which exceeds the distance from a rear end (13) of the seam guide assembly (1) to a position (P) in front of the weld coil (203) in the travel direction (T) of the tube, and, wherein the straight first section (306) of the tubular member (301) has an outer diameter, which is smaller than the inner diameter of the tube (100) to be welded.

7. The apparatus of claim 4, wherein tubular member (301) comprises a second section (307) having a rear end carrying the coupling (304), said second section (307) being at an angle in relation to the first section (306), and, wherein the back flushing device (300) preferably is arranged in the apparatus, in such a way that the metal strip (102) is roll formed around the straight first section (306) of the tubular member (301) and the reverse flow nozzle (302) is located in front of the weld coil in the travel direction (T) of the tube (100).

8. A tube which has manufactured by the apparatus of claim 1, wherein the metal strip comprises aluminium or alloys thereof.

9. The apparatus of claim 1, further comprising a rear seam guide tip component (10), which is attached to the holder (3) in such a way that an elongated tip (11) protrudes from the first side (5) of the holder (3), wherein the rear seam guide tip component (10) is positioned on the holder on a distance from the front seam guide tip component (2) in a longitudinal direction of the holder, and the channel inlet opening (7) is located between the said front and rear tip components (2, 10).

10. The apparatus of claim 1, wherein the inlet opening (7) of the channel (6) has width, which does not exceed the outer diameter of the tube (100), and which preferably corresponds approximately to the distance between the edges of the strip (102) being nearly formed into a tube.

11. The apparatus of claim 1, wherein the holder (3) comprises guiding flanges (12), which are arranged on each side of the channel inlet opening (7).

12. A method of manufacturing a tube comprising aluminium or alloys thereof, comprising roll forming a strip comprising aluminium or alloys thereof into a tube (100) in a roll forming section (202) of a welded tube roll forming apparatus (200); and welding together the tube edges (101) in a high frequency induction welding section (201) of said apparatus, comprising a weld coil (203) and a pair of weld rollers (204), wherein the welding comprises extracting solid particles produced inside the tube (100) during the high frequency induction welding by application of vacuum at a section (205) of the tube, between the weld coil (203) and the roll forming section (202) where the edges (101) of the roll formed tube have not yet been welded together, by means of the seam guide assembly (1), said seam guide assembly (1) comprising a front seam guide tip component (2), which is attached to a holder (3) in such a way that an elongated tip (4) protrudes from a first side (5) of the holder (3), said tip (4) being configured to be inserted between the tube edges (101) to be welded, wherein a through channel (6) is provided in the holder (3), said channel having an inlet opening (7) located on said first side (5) of the holder, adjacent the front seam guide tip component (2) in a longitudinal direction of the holder, and an outlet opening (8) located on a second side (9) of the holder, said outlet opening being configured to be connected to a vacuum source, and wherein the through channel (6) is configured for removal of emission of solid particles resulting inside the tube (100) due to welding by means of applying a vacuum at the outlet opening (8), and the inlet opening (7) of the channel (6) has an elongated shape directed in the longitudinal direction of the holder (3).

13. The method of claim 12, further comprising back flushing of said solid particles by applying pressurized gas in a direction opposite to the travel direction (T) of the tube (100) at a position (P) in front of the weld coil (203) in the tube travel direction (T).

* * * * *